United States Patent [19]

Taber et al.

[11] 4,009,604
[45] Mar. 1, 1977

[54] PRESSURE CONVERTER FOR CALIBRATING GAUGES

[75] Inventors: Samuel D. Taber; James H. Coulter, both of Santa Rosa, Calif.

[73] Assignee: National Controls, Inc., Santa Rosa, Calif.

[22] Filed: Aug. 7, 1975

[21] Appl. No.: 602,569

[52] U.S. Cl. .............................. 73/4 R; 73/407 PR; 177/172; 177/208
[51] Int. Cl.² ..................... G01L 27/00; G01G 5/04
[58] Field of Search .............. 73/4 R, 37, 264, 397, 73/407 PR, 412; 177/172, 208, 251

[56] References Cited

UNITED STATES PATENTS

| | | | |
|---|---|---|---|
| 2,494,781 | 1/1950 | Stover | 73/203 X |
| 2,937,528 | 5/1960 | Ketchum | 73/407 PR |
| 2,976,731 | 3/1961 | Westman | 73/407 PR |
| 3,079,074 | 2/1963 | Jordan | 73/407 PR X |
| 3,822,596 | 7/1974 | Bonner | 73/407 R |

*Primary Examiner*—Richard C. Queisser
*Assistant Examiner*—John S. Appleman
*Attorney, Agent, or Firm*—Flehr, Hohbach, Test, Albritton & Herbert

[57] ABSTRACT

Pressure converter for use between a hydraulic load sensing element and a gauge or other device to indicate a property of the load directly in desired units. The pressure converter comprises a first force-pressure transducer connected hydraulically to the sensing element, a second force-pressure transducer connected hydraulically to the gauge, and a pivotally mounted beam having first and second arms connected to the transducers for producing a pressure in the second transducer corresponding to the pressure from the sensing element and the relative lengths of the arms. In one embodiment, the beam pivots about an adjustable fulcrum member which can be moved axially of the beam to vary the lengths of the arms and provide the desired calibration. In a second embodiment, the pivot for the beam is provided by a flexure plate, and the lengths of the arms are adjusted by changing the distances between the load cells and the flexure plates.

3 Claims, 6 Drawing Figures

PRESSURE CONVERTER FOR CALIBRATING GAUGES

BACKGROUND OF THE INVENTION

This invention pertains generally to pressure converters and more particularly to a pressure converter for use between a hydraulic load sensor and a guage or other hydraulically operated indicating device to calibrate the gauge or other device to indicate a property of the load directly in pounds or other desired units.

Heretofore, scales or other devices have been provided utilizing a hydraulic load sensing element connected to a gauge or other hydraulically operated indicating device to detect the weight or another physical property of the load. A problem exists with such systems in that the response characteristics of the sensing element and indicator must be closely matched to provide the desired readings. If, for example, the indicator is designed to read from 0 to 100 pounds for input pressures ranging from 0 to 10 PSI, the reading will be accurate only if the sensing element produces output pressures ranging exactly from 0 to 10 PSI for loads weighing from 0 to 100 pounds. In practice, it is difficult to find sensing elements and indicators which are matched in the desired number.

SUMMARY AND OBJECTS OF THE INVENTION

The invention provides a pressure converter for use between a hydraulic load sensing element and a gauge or other hydraulically operated indicating device to match the characteristics of the sensing element and the gauge. The pressure converter comprises a first force-pressure transducer connected hydraulically to the sensing element, a second force-pressure transducer connected hydraulically to the gauge, and a pivotally mounted beam having first and second arms connected to the transducers for producing a pressure in the second transducer corresponding to the pressure from the sensing element and the relative lengths of the arms. In one embodiment, the beam pivots about a fulcrum member which is movable axially of the beam to vary the lengths of the arms and provide the desired calibration. In a second embodiment, the pivot for the beam is provided by a flexure plate, and the lengths of the arms are adjusted by changing the distances between the load cells and the flexure plates.

It is in general an object of the invention to provide a new and improved pressure converter for use between a hydraulic load sensor and a gauge or other hydraulically operated indicating device.

Another object of the invention is to provide a pressure converter of the above character in which the output pressure can be adjusted relative to the input pressure.

Another object of the invention is to provide a pressure converter of the above character utilizing a pair of force-pressure transducers and a pivotally mounted beam connected to the transducers to produce an output pressure having a predetermined relationship to the input pressure.

Additional objects and features of the invention will be apparent from the following description in which the preferred embodiments are set forth in detail in conjunction with the accompanying drawings.

DESCRIPTION OF THE PREFERRED EMBODIMENTS

Figure 1:
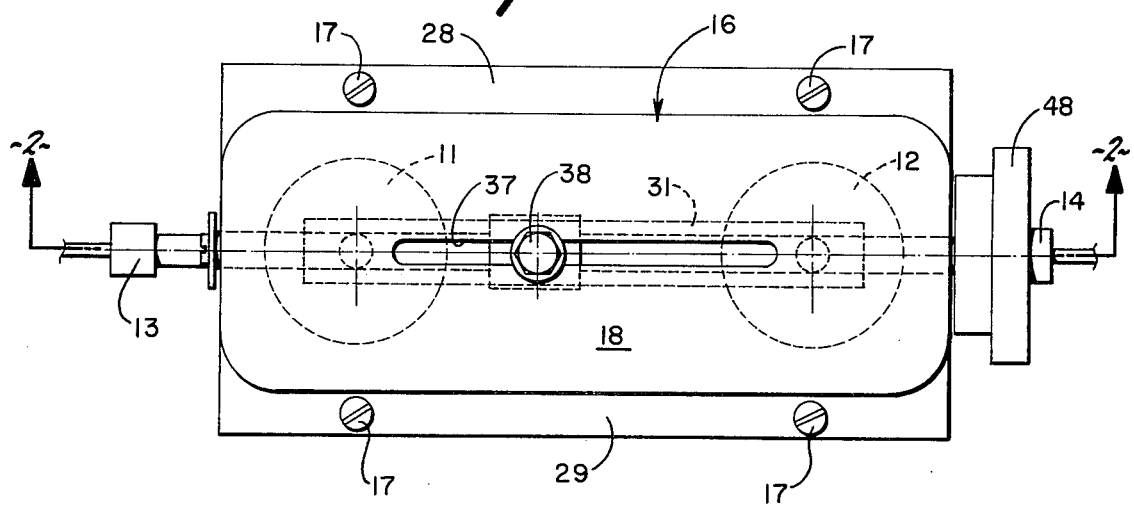
FIG. 1 is a top plan view of one embodiment of a pressure converter according to the invention.
Figure 2:
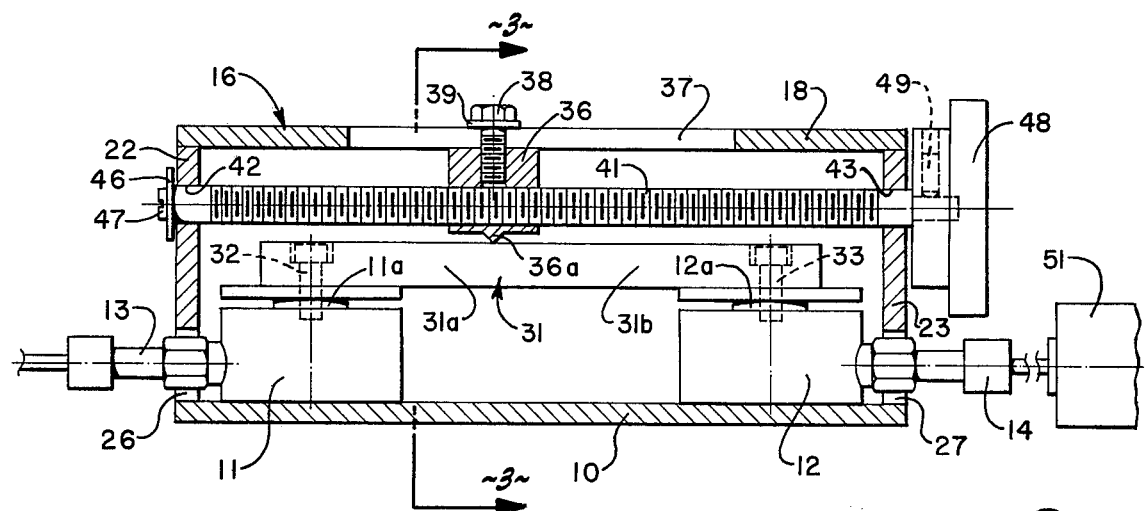
FIG. 2 is a cross sectional view taken along line 2—2 of FIG. 1.
Figure 3:
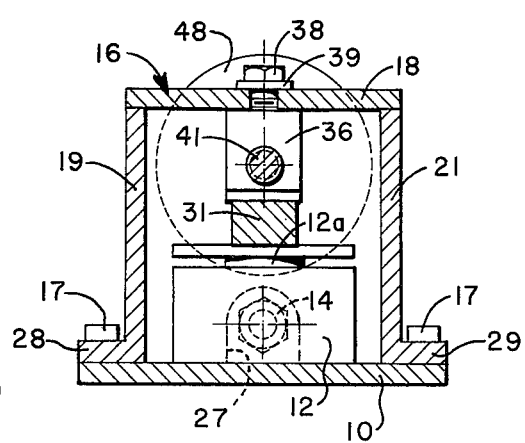
FIG. 3 is a cross sectional view taken along line 3—3 of FIG. 2.

The pressure converter illustrated in FIGS. 1–3 comprises a generally rectangular base 10 upon which a pair of force-pressure transducers 11, 12 are mounted. These transducers are of conventional design, and they each include a fluid chamber and a movable member 11a, 12a, such as a piston or diaphragm, for varying the volume of the chamber. An inlet fitting 13 communicates with the chamber in transducer 11, and an outlet fitting 14 communicates with the chamber in transducer 12.

A generally rectangular cover 16 is removably mounted on the base and secured thereto by screws 17. The cover comprises a top wall 18, side walls 19, 21 and end walls 22, 23 joined together to form a unitary structure. U-shaped cutouts 26, 27 open through the lower edges of the end walls to accommodate the inlet and outlet fittings, and flanges 28, 29 extend laterally from the lower portions of the side walls to receive screws 17.

A pivotally mounted beam 31 extends in an axial direction between the transducers and is connected to movable members 11a, 12a by screws 32, 33. A fulcrum member 36 is mounted above the beam and provided with a knife edge 36a which engages the upper surface of the beam. The knife edge divides the beam into a first arm 31a and a second arm 31b. Arm 31a has an effective length equal to the distance between the center line of screw 32 and the point of contact with the knife edge, and arm 31b has an effective length equal to the distance between the center line of screw 33 and the point of contact between the beam and knife edge.

An axially extending slot 37 is formed in the upper wall 18 of cover 16 above beam 31, and a screw 38 extends through the slot into fulcrum member 36 to constrain the fulcrum member for movement parallel to the axis of the beam. A washer 39 is provided between the head of screw 38 and the upper surface of the top wall of the cover.

Means is provided for adjusting the axial position of fulcrum member 36. This means includes an axially extending feed screw 41 which threadedly engages the fulcrum member and is rotatively mounted in axially aligned openings 42, 43 in end walls 22, 23. A washer 46 of larger diameter than opening 42 is mounted on the end of the feed screw outside end wall 22 by a screw 47. A hand wheel 48 is mounted on the other end of the feed screw and secured thereto by a set screw 49. The hand wheel provides means for turning the feed screw, and it cooperates with washer 46 to constrain the feed screw against axial movement.

Operation and use of the embodiment of FIGS. 1–3 can now be described. It is assumed that the chambers of transducers 11, 12 are filled with a suitable fluid such as oil and that inlet fitting 13 is connected to the hydraulic load cell of a scale, not shown. It is further assumed that outlet fitting 14 is connected to a suitable hydraulically operated indicating device 51 such as a dial having an indicator driven by a Bourdon tube.

Calibration of the dial is achieved by placing a known weight on the scale and turning hand wheel 48 to move fulcrum member 36 until the dial indicates the correct weight. The weight on the scale produces a pressure in transducer 11 which exerts a force on arm 31a of beam 31. Beam arm 31b applies a corresponding force to transducer 12 and produces a corresponding pressure in the fluid in that transducer. For a given weight or input pressure, the pressure produced in transducer 12 is determined by the relative lengths of arms 31a and 31b, which are determined by the position of knife edge 36a. When the correct reading is obtained for the known weight, the fulcrum member and knife edge are in the correct position for the desired calibration, and screw 38 is tightened to hold the fulcrum member and knife edge in this position. Thereafter, the gauge will indicate the weights of other objects directly in the desired units.

Figure 4:
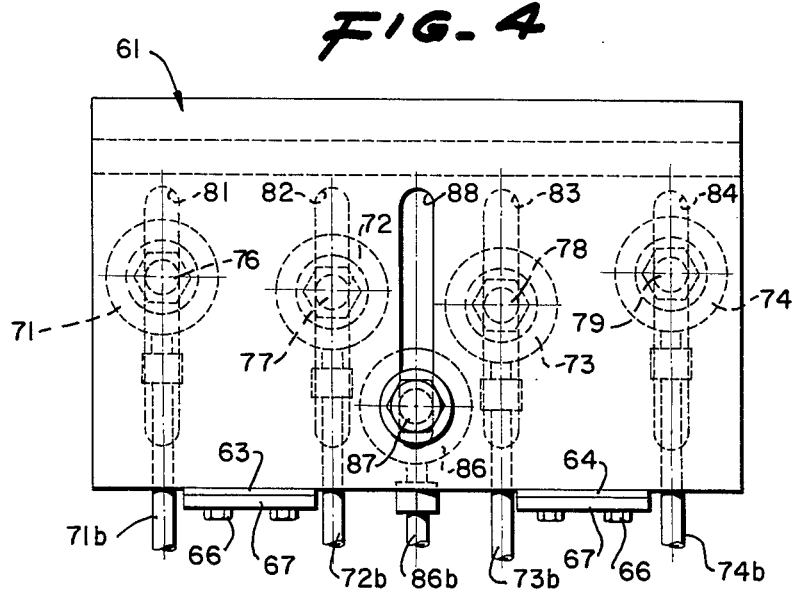
FIG. 4 is a top plan view of a second embodiment of a pressure converter according to the invention.
Figure 5:
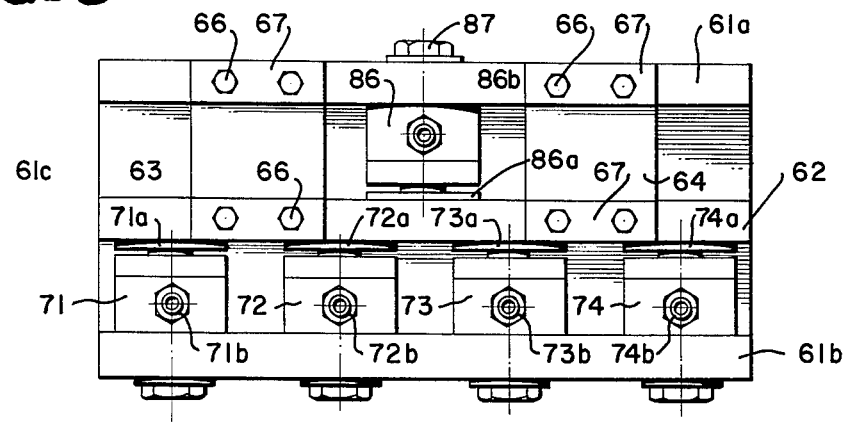
FIG. 5 is a side elevational view of the embodiment of FIG. 4.
Figure 6:
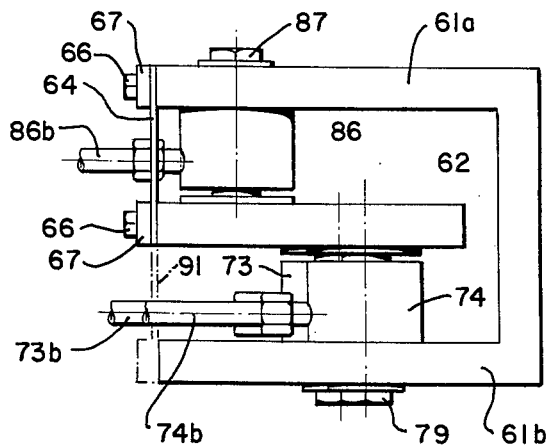
FIG. 6 is an end elevational view of the embodiment of FIG. 4.

The embodiment of FIGS. 4–6 includes a rigid base 61 having spaced apart, generally parallel legs 61a, 61b joined together by an upright arm 61c. A beam or lever 62 is disposed between the legs of the base and extends in a direction generally parallel to the legs. Flexure plates 63, 64 extend between leg 61a and one end of beam 62, whereby the beam is adapted to pivot about an axis parallel to the legs of the base. The flexure plates are of a suitable material, such as stainless steel, and they are affixed to the base and beam by screws 66 and bars 67.

A plurality of input transducers 71–74 are mounted on leg 61b of the base. Each of these transducers is of conventional design, similar to transducers 11, 12, and they each include a fluid chamber and a movable member 71a–74a, such as a piston or diaphragm, for varying the volume of the chamber. Inlet lines 71b–74b communicate with the chambers in transducers 71–74, respectively, and provide means for connecting the transducers to a pressure source. The transducers are affixed to the base by means of screws 76–79 which pass through slots 81–84 in leg 61b, whereby the relative distances between the transducers and the flexure plates can be adjusted. Movable members 71a–74a engage the lower surface of beam 62 at distances from the flexure plates determined by the relative positions of the transducers on base 61.

An output transducer 86 is mounted on leg 61a of the base. This transducer is similar to the other transducers, and it includes a fluid chamber and a movable member 86a, such as a piston or diaphragm, for varying the volume of the chamber. An output line 86b communicates with the chamber and provides means for connecting the transducers to a pressure indicator. Transducer 86 is adjustably mounted on leg 61a by means of a screw 87 which passes through a slotted opening 88 in the base, and movable member 86a engages the upper surface of beam 62 at a distance from the flexure plates determined by the positioning of the transducer on the base.

Operation and use of the embodiment of FIGS. 4–6 can now be described. It is assumed that the chambers of transducers 71–74 and 86 are filled with a suitable fluid such as oil and that inlet lines 71b–74b are connected to one or more pressure sources such as hydraulic load cells in a scale, not shown. It is further assumed that outlet line 86b is connected to a suitable hydraulically operated indicating device such as a dial having an indicator driven by a Bourdon tube.

Compensation for variation in the pressure sources can be made by adjusting the distances between the respective input transducers and the flexure plates. The conversion factor of the device, i.e. the ratio of output pressure to input pressure, can be adjusted by changing the relative spacings of the input and output transducers from the flexure plates. This adjustment is most conveniently made by changing the position of the output transducer on leg 61a of the base.

In FIGS. 4–6, it will be noted that the distance between output transducer 86 and flexure plates 63–64 is less than the distance between input transducers 71–74 and the flexure plates. Since it is desirable to maintain the flexure plates in tension, rather than compression, this arrangement is preferred for situations in which the output pressure will be greater than the input pressure. For applications in which the output pressure will be less than the input pressure, the output transducer can be spaced farther from the flexure plates than the input transducers, and the flexure plates can be connected between beam 62 and the lower leg 61b of the base, as indicated by phantom lines 91.

While the embodiment of FIGS. 4–6 has been illustrated in conjunction with a plurality of input transducers, it can also be utilized with a single input transducer. In this case, the input transducer is preferably aligned axially of the beam with the output transducer to prevent side loading of the transducers.

The invention has a number of important features and advantages. It is compact and inexpensive to manufacture, and it permits the use of unmatched sensing elements and gauges to provide readings in desired units.

It is apparent from the foregoing that a new and improved pressure converter has been provided. While only the preferred embodiments have been described, as will be apparent to those familiar with the art, certain changes and modifications can be made without departing from the scope of the invention as defined by the following claims.

What is claimed is:

1. In a pressure converter for connection between a pressure source and a pressure operated indicator: a base having first and second spaced apart, generally parallel legs, a beam member disposed between the legs of the base and extending in a direction generally parallel thereto, a flexure connected between the beam member and one of the legs of the base, first and second force-pressure transducers mounted respectively on the first and second legs of the base, each of the transducers comprising a chamber for receiving fluid and movable means for varying the volume of chamber, means for connecting the chamber of the first transducer to the pressure source, and means for connecting the chamber of the second transducer to the indicator, the movable means of the first and second transducers being connected to the beam member at predetermined distances from the flexure, whereby the pressure applied to the indicator is determined by the source pressure and the ratio of the predetermined distances, the transducers being mounted on the legs of the base in a manner permitting adjustment of the predetermined distances.

2. The pressure converter of claim 1 wherein the movable means of the transducers are connected to the beam member by engagement with said member.

3. The pressure converter of claim 1 further including an additional transducer mounted on the first leg of the base and having a chamber for receiving fluid and movable means for varying the volume of the chamber, the movable means of the additional transducer being connected to the beam member, and means for connecting the chamber of the additional transducer to the pressure source.

* * * * *